(12) United States Patent
Elmoalem et al.

(10) Patent No.: US 8,855,491 B2
(45) Date of Patent: Oct. 7, 2014

(54) TECHNIQUES FOR PROTECTING PASSIVE OPTICAL NETWORKS

(75) Inventors: Eli Elmoalem, Nili (IL); Amiad Dvir, Nes-Ziona (IL)

(73) Assignee: Broadcom Corporation, Irvine, CA (US)

( * ) Notice: Subject to any disclaimer, the term of this patent is extended or adjusted under 35 U.S.C. 154(b) by 553 days.

(21) Appl. No.: 12/648,885

(22) Filed: Dec. 29, 2009

(65) Prior Publication Data

US 2010/0166419 A1  Jul. 1, 2010

Related U.S. Application Data

(60) Provisional application No. 61/141,489, filed on Dec. 30, 2008.

(51) Int. Cl.
*H04J 14/00* (2006.01)
*H04Q 11/00* (2006.01)
*H04J 3/06* (2006.01)

(52) U.S. Cl.
CPC ... *H04Q 11/0067* (2013.01); *H04Q 2011/0015* (2013.01); *H04J 3/0682* (2013.01); *H04Q 2011/0035* (2013.01); *H04Q 2011/0081* (2013.01)
USPC .................. 398/71; 398/72; 398/70; 398/67; 398/66

(58) Field of Classification Search
USPC ............ 398/71, 72, 70, 2, 5, 7, 8, 69, 68, 66, 398/67, 63, 58
See application file for complete search history.

(56) References Cited

U.S. PATENT DOCUMENTS

| | | |
|---|---|---|
| 6,868,232 B2 | 3/2005 | Eijk et al. |
| 6,975,586 B1 | 12/2005 | Yoshimura |
| 6,980,287 B2 | 12/2005 | Renard et al. |
| 7,167,237 B2 | 1/2007 | Shimizu et al. |
| 7,181,142 B1 | 2/2007 | Xu et al. |
| 7,428,382 B2 | 9/2008 | Soto et al. |

(Continued)

FOREIGN PATENT DOCUMENTS

GB     2 292 495 A     2/1996

OTHER PUBLICATIONS

International Search Report directed to related International Application No. PCT/IB2012/001675, dated Apr. 3, 2013, from the European Patent Office, Rijswijk, The Netherlands; 3 pages.

(Continued)

*Primary Examiner* — M. R. Sedighian
(74) *Attorney, Agent, or Firm* — Sterne, Kessler, Goldstein & Fox PLLC

(57) ABSTRACT

A method for performing a protection in passive optical networks. The method comprises forming a protection maintenance link between an active optical line terminal (OLT) and a standby OLT; forming a synchronization link between the active OLT and the standby OLT; computing a base differential distance value; continuously measuring round trip time (RTT) values by the active OLT using the protection maintenance link; periodically sending at least RTT values calculated by the active OLT to the standby OLT over the synchronization link; and computing, by the standby OLT, a new RTT value based on at least a RTT value measured by the active OLT and a standby differential distance value, when a switchover action is triggered, thereby allowing the standby OLT to serve optical network units (ONUs) in the PON without performing a ranging process.

22 Claims, 6 Drawing Sheets

(56) References Cited

U.S. PATENT DOCUMENTS

| | | | |
|---|---|---|---|
| 7,715,718 B2 | 5/2010 | Smith et al. | |
| 8,050,554 B2 | 11/2011 | Jang et al. | |
| 8,306,421 B1* | 11/2012 | Mazuk et al. | 398/66 |
| 8,331,784 B2* | 12/2012 | Mizutani et al. | 398/70 |
| 8,655,167 B1 | 2/2014 | Lam et al. | |
| 2002/0109875 A1 | 8/2002 | Eijk et al. | |
| 2002/0109876 A1 | 8/2002 | Eijk et al. | |
| 2004/0196664 A1 | 10/2004 | Renard et al. | |
| 2006/0007426 A1 | 1/2006 | Weller | |
| 2007/0172239 A1* | 7/2007 | Yamazaki et al. | 398/68 |
| 2007/0274717 A1 | 11/2007 | Xu et al. | |
| 2008/0031624 A1 | 2/2008 | Smith et al. | |
| 2008/0037981 A1* | 2/2008 | Mukojima | 398/10 |
| 2008/0069564 A1* | 3/2008 | Bernard | 398/72 |
| 2008/0131124 A1* | 6/2008 | Nam et al. | 398/67 |
| 2009/0060496 A1 | 3/2009 | Liu et al. | |
| 2009/0067835 A1 | 3/2009 | Chen | |
| 2009/0115999 A1 | 5/2009 | Watte et al. | |
| 2009/0268197 A1 | 10/2009 | Perron et al. | |
| 2009/0274455 A1 | 11/2009 | Dvir et al. | |
| 2009/0290872 A1 | 11/2009 | Xu et al. | |
| 2009/0290875 A1 | 11/2009 | Xu et al. | |
| 2011/0280568 A1 | 11/2011 | Dvir et al. | |

OTHER PUBLICATIONS

International Preliminary Report on Patentability with Written Opinion directed to related International Application No. PCT/IB2012/001675, dated Jan. 28, 2014, from The International Bureau of WIPO, Geneva, Switzerland; 7 pages.

* cited by examiner

TECHNIQUES FOR PROTECTING PASSIVE OPTICAL NETWORKS

CROSS REFERENCE TO RELATED APPLICATIONS

This application claims the benefit of U.S. Provisional Application No. 61/141,489 filed on Dec. 30, 2008, the contents of which are herein incorporated by reference.

TECHNICAL FIELD

The present invention relates generally to passive optical networks (PONs), and more particularly to protection of such networks.

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include a Broadband PON (BPON), an Ethernet PON (EPON), a Gigabit PON (GPON), and others.

An exemplary diagram of a typical PON 100 is schematically shown in FIG. 1. The PON 100 includes N ONUs 120-1 through 120-N (collectively known as ONUs 120) coupled to an OLT 130 via a passive optical splitter 140. In a GPON, for example, traffic data transmission is achieved using GPON encapsulation method (GEM) encapsulation over two optical wavelengths, one for the downstream direction and another for the upstream direction. Thus, downstream transmission from the OLT 130 is broadcast to all the ONUs 120. Each ONU 120 filters its respective data according to pre-assigned labels (e.g., GEM port-IDs in a GPON). The splitter 140 is 1 to N splitter, i.e., capable of distributing traffic between a single OLT 130 and N ONUs 120.

In most PON architectures, the upstream transmission is shared between the ONUs 120 in a TDMA based access, controlled by the OLT 130. TDMA requires that the OLT first discovers the ONUs and measures their round-trip-time (RTT), before enabling coordinated access to the upstream link. For example, in a GPON network, during initial set-up an ONU 120 and the OLT 130 may be in one of the following operational states: serial number acquisition or ranging. In the serial-number acquisition state, the OLT 130 tries to detect the serial number of an ONU 120. If the OLT 130 and an ONU 120 have not completed the serial number acquisition stage, due to a low power signal, the ONU 120 independently changes its optical power output until a successful detection of the serial number. In the ranging state, the OLT 130 tries to determine the range between the terminal units (i.e., ONUs 120) to find out at least the round trip time (RTT) between OTL 130 and each of the ONUs 120. The RTT of each ONU 120 is necessary in order to coordinate a TDMA based access of all ONUs 120 to the shared upstream link.

During a normal operation mode the range between the OLT 130 to the ONUs 120 may change over time due to temperature changes on the fiber links (which results with varying signal propagation time on the fiber). The OLT 130 continuously measures the RTT and adjusts the TDMA scheme for each ONU accordingly.

In order to enable protection in PONs a redundant optical link and OLT are connected to a splitter. This type of a configuration is usually referred to as a duplex PON system. An example for such a system is a protection type B, defined in ITU-T standard G.984.1. An illustration of a duplex PON 200 is provided in FIG. 2. As can be noticed two OLTs 210-1 and 210-2 are respectively connected via optical fibers 220-1 and 220-2 to a splitter 230. The splitter 230 splits incoming traffic to N OUNs 240-1 and 240-N. That is, in this example, the splitter 230 is a 2 to N splitter.

In the duplex PON 200 one of the OLTs is set as active while the other as a standby. When there is a failure in the active OLT or its respective fiber a fail-over is performed and the operation is switched to the standby OLT and traffic is sent through its respective fiber. Typically, a synchronization link is established between the OLTs 210 to transfer database updates, PON status messages and switch-over trigger signals.

However, in order to ensure minimal service interruption due to a switch-over action, the standby OLT should perform at least the ranging process when turning into an active OLT. The lengths of the standby and active optical links are not the same. Performing such a process when establishing the network is an error prone approach as the "range" between the OLTs 210 and the terminal units (i.e., ONUs 240) may change over time and therefore there may be different RTT times and optical power levels for signals transmission power. Performing the ranging process for each ONU when switching-over is a time-consuming task and typically results with a long service interruption time, as the PON remains idle for duration that the ranging process takes place.

In addition, the topology of the network may change over time. For example, an ONU may be added or removed from the network. Thus, the standby OLT should maintain updated information relating to the status of the PON, as acquiring such information when switching-over is a time consuming process through which the PON remains idle.

A protection mechanism should maintain a fast and reliable communication channel between the two OLTs, whether the active and standby OLTs 210 are collocated on the same shelf, rack, or reside in geographically remote sites. In addition, a logic unit controlling the protection mechanism should be continuously updated with the status of both the fiber links connecting the standby and active OLTs 210 to the splitter 230. Since the standby OLT (e.g., OLT 210-1) cannot transmit data on its link (e.g., 220-1) while is in standby mode, thus, it is necessary to monitor the standby OLT link before a switch-over operation.

It would be therefore advantageous to provide an efficient protection mechanism for PONs.

SUMMARY OF THE INVENTION

Certain embodiments of the invention include a method for performing a protection in a passive optical network (PON). The method comprises forming a protection maintenance link between an active optical line terminal (OLT) and a standby OLT; forming a synchronization link between the active OLT and the standby OLT; computing a base differential distance value; continuously measuring round trip time (RTT) values by the active OLT using the protection maintenance link; periodically sending at least RTT values calculated by the active OLT to the standby OLT over the synchronization link; and computing, by the standby OLT, a new RTT value based on at least a RTT value measured by the active OLT and a standby differential distance value, when a switch-over action is triggered, thereby allowing the standby OLT to serve optical network units (ONUs) in the PON without performing a ranging process.

Certain embodiments of the invention also include a duplex passive optical network (PON). The duplex PON comprises a first optical line terminal (OLT) serving as an active OLT; a first optical network unit (ONU) collocated to the first OLT; a second OLT serving as a standby OLT; a second ONU collocated to the second OLT; and an optical splitter for connecting the first OLT and the second OLT and their collocated first ONU and second ONU to a plurality of ONUs.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
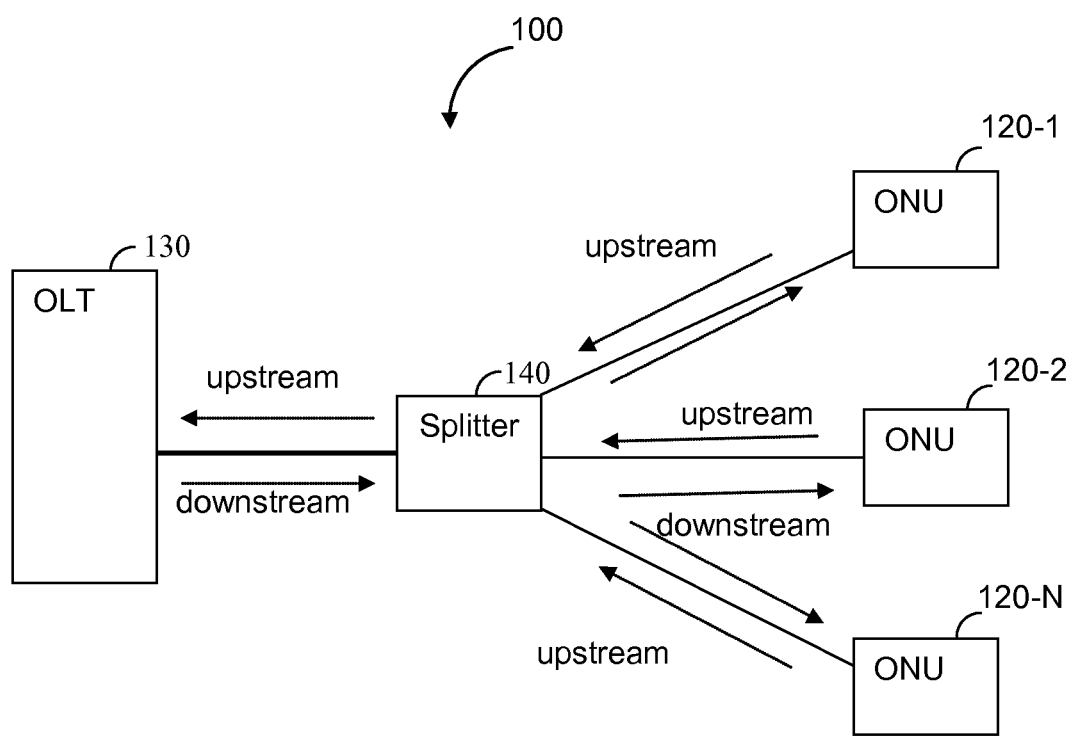
FIG. 1 is a schematic diagram of a PON.
Figure 2:
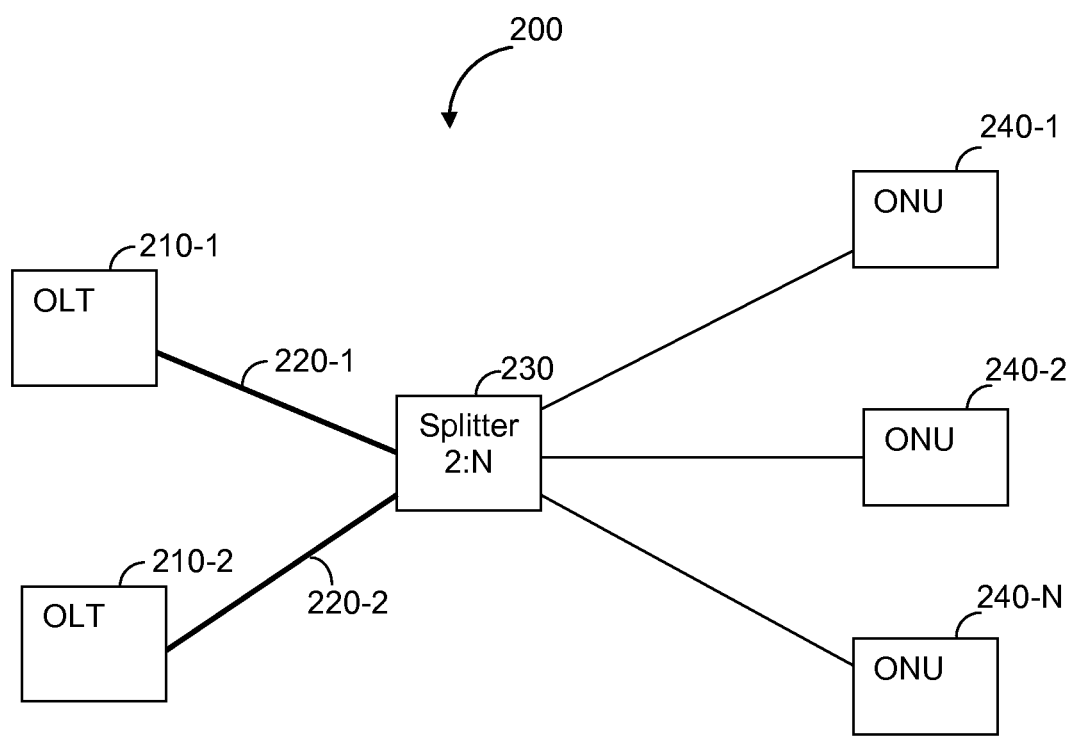
FIG. 2 is a schematic diagram of a conventional duplex PON.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
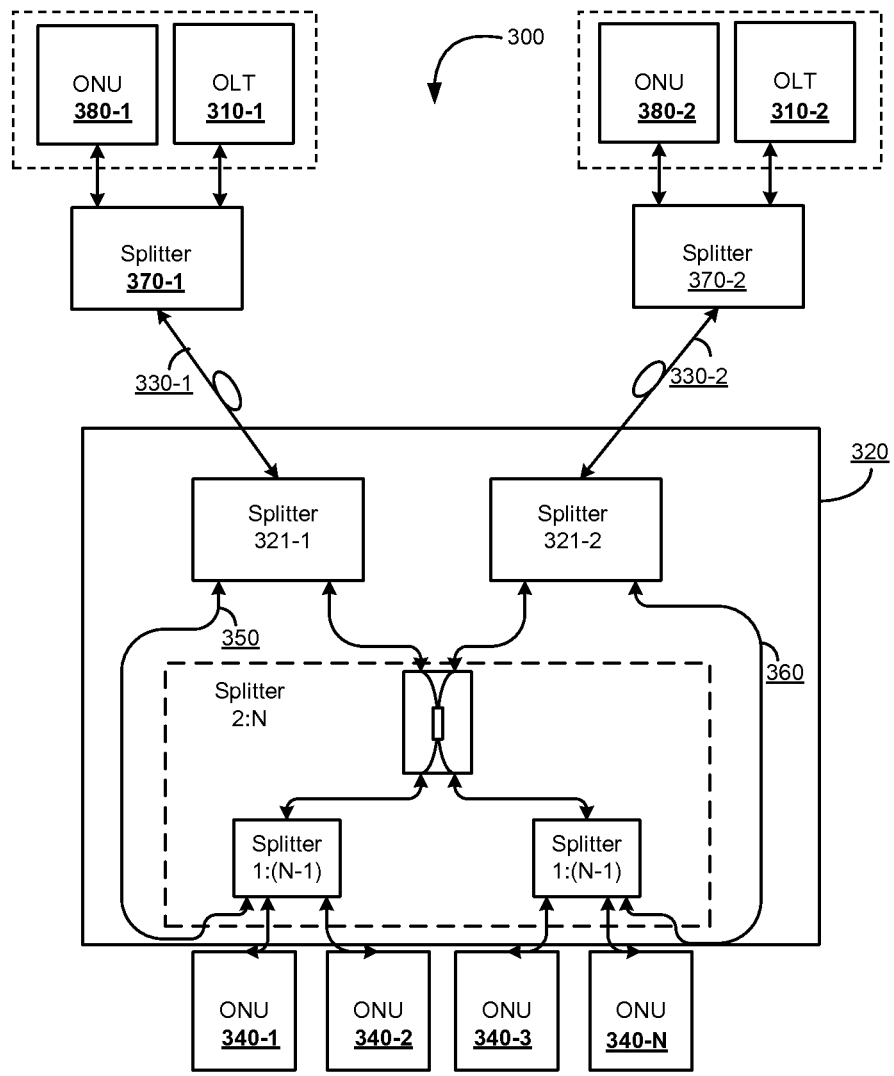
FIG. 3 is a schematic diagram of a duplex PON constructed in accordance with an embodiment of the present invention.

FIG. 3 shows an exemplary block diagram of a duplex PON 300 constructed in accordance with an embodiment of the invention. The PON 300 includes two OLTs 310-1 and 310-2 respectively coupled to a splitter 321-1 or 321-2 via optical links (e.g., optical fibers) 330-1 and 330-2. The splitters 321-1 and 321-2 are coupled to a number of N ONUs 340 where a single optical link connects the splitter and each of the ONUs 340. In the configuration of the PON 300 the optical links 330 as well as OLTs 310 are protected. That is, one OLT and its respective optical link (e.g., OLT 310-1 and optical link 330-1) are active while the other pair (e.g., OLT 310-2 an optical link 330-2) are standby.

In accordance with principles of the invention, two output optical links 350 and 360 respectively couple two output ports of the splitters 321-1 and 321-2 to the OLT links 330-1 and 330-2, and then these ONU signals are coupled by splitters 370-1 and 370-2 to ONUs 380-1 and 380-2, which are respectively collocated to OLTs 310-1 and 310-2. This arrangement enables each OLT to control and manage all ONUs 340 and the ONU collocated to its peer OLT via the fibers 330 connecting the OLTs 310 to the splitter 320. For example, OLT 310-1 controls ONUs 340 as well as ONU 380-2.

The optical links 350 and 360, the splitters 370-1, 370-2, 321-1 and 321-2, and the fiber links 330 create a link (hereinafter "the protection maintenance link") between the OLTs 310 and the ONUs 380. The protection maintenance link is used for continuous calculation of the differential distance as will be described in greater detail value.

OLT 310 manages a collocated ONU function 380, which acts as any ONUs 340. That is, an OLT 310-1 (e.g., active OLT) manages the ONU 380-2 collocated with the OLT 310-2 (e.g., standby OLT) and an active OLT 310-2 manages the ONU 380-2 collocated with the OLT 310-1. The OLT 310-1 and collocated ONU 380-1 are connected to the splitter 320 through a 2:1 splitter 370-1 and the OLT 310-2 and collocated ONU 380-2 are connected to a 2:1 splitter 370-2. In an exemplary embodiment the splitter 370-1 or 370-2 is used to multiplex both OLT signals and ONU signals on the same fiber. A non-limiting diagram of the splitters 370-1, 370-2, 321-1 and 321-2 constructed in accordance with an embodiment of the invention is provided in FIG. 6.

In accordance with one embodiment of the invention, both OLTs 310-1 and 310-2 include a database having the same information, synchronized between the OLTs. The databases maintain the updated round-trip time and PON related information. It should be appreciated by one of ordinary skill in the art that sharing such information between the OLTs 310-1 and 310-2 allows fast switch-over from an active link to a standby link, as the standby OLT does not require to acquire this information when switching-over.

In another embodiment of the invention, a synchronization link between the two OLTs 310-1 and 310-2 can be implemented over the protection maintenance link. The OLTs share updated round-trip time and PON related information. For example, this information includes progress reports of an ONU activation process, ONU alarms indications, learned passwords, RTT (or equalization delay) measurements, and switch-over trigger signals. In one embodiment of the invention the protection maintenance link between the OLTs can be exploited as a synchronization link. This is especially useful when, for example, the two OLTs reside in geographically remote sites.

As mentioned above in order to ensure fast protection switch-over, the ranging process should not be performed by the standby OLT when switching-over. With this aim, in accordance with an embodiment of the invention a "base differential distance" value is computed. The base differential distance is the differential distance of the OLTs 310 from a designated ONU 340 as measured during installation.

Figure 4:
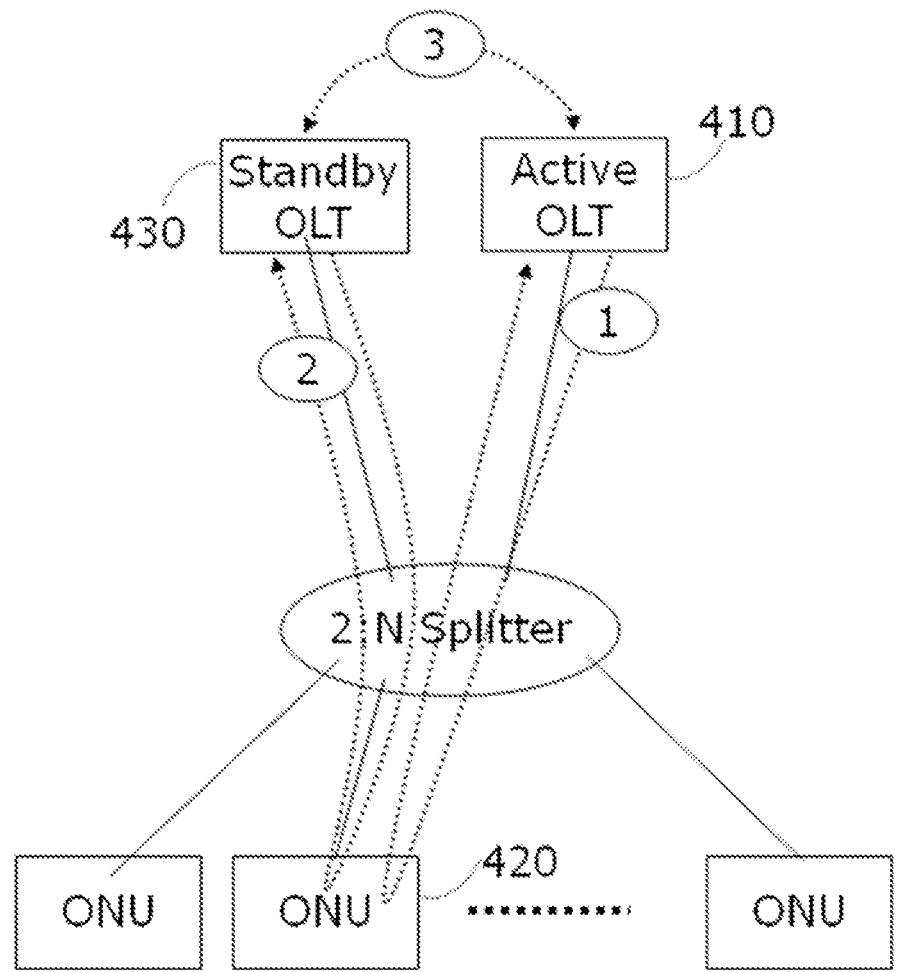
FIG. 4 is a diagram illustrating a process for measuring the differential distance.

As illustrated in FIG. 4 to measure a base differential distance, an active OLT 410 measures the RTT to a designated ONU 420 and then deactivates the ONU 420. Thereafter, a standby OLT 430 activates the ONU 420 and measures the RTT to the ONU 420 and then deactivates it. Finally, the OLTs 410 and 430 exchange the RTT measurements. The base differential distance is the difference between the RTT measurements. This process is performed at the installation of the PON. It should be noted that the measurement of the differential distance can be performed with any of the ONUs on the PON, including, as illustrated in FIG. 3, the ONU 380 collocated to the OLT 310.

The standby OLT continuously measures and maintains an updated differential distance value as this value may change over time. In accordance with an embodiment of the invention, the differential distance $DiffRTT_S(t)$ from a standby OLT to an ONU at a time 't' is computed as follows:

$$DiffRTT_S(t) = (RTT\_ONU_S(t) - BaseRTT\_ONU_S) + BaseDiffRTT_S$$

wherein a $RTT\_ONU_S(t)$ is a RTT value measured from the active OLT ($OLT_A$) to the ONU collocated to the standby OLT (ONU$_S$) at time T, and the BaseRTT_ONU$_S$ is the RTT measured from an OLT$_A$ to an ONU$_S$ at installation time, when BaseDiffRTT$_S$ is computed. The RTT_ONU$_S$(t) and BaseRTT_ONU$_S$ are calculated using the protection maintenance link.

During normal operation of the PON, the active OLT (OLT$_A$) continuously monitors the RTT of the ONUs in the network, and measures the RTT(i,t) of an ONU 'i' at time 't'. These measures are periodically sent to the standby OLT over the synchronization link. When a switch-over occurs, the standby OLT becomes active, and calculates a new RTT value of ONU 'i', as follows:

$$\text{New-RTT}(i,t) = \text{RTT}(i,t) + \text{DiffRTT}_S(t)$$

This way, when the standby OLT becomes active, it can immediately provide services to the ONUs, using the New RTT values, and does not need to perform a ranging process.

Figure 5:
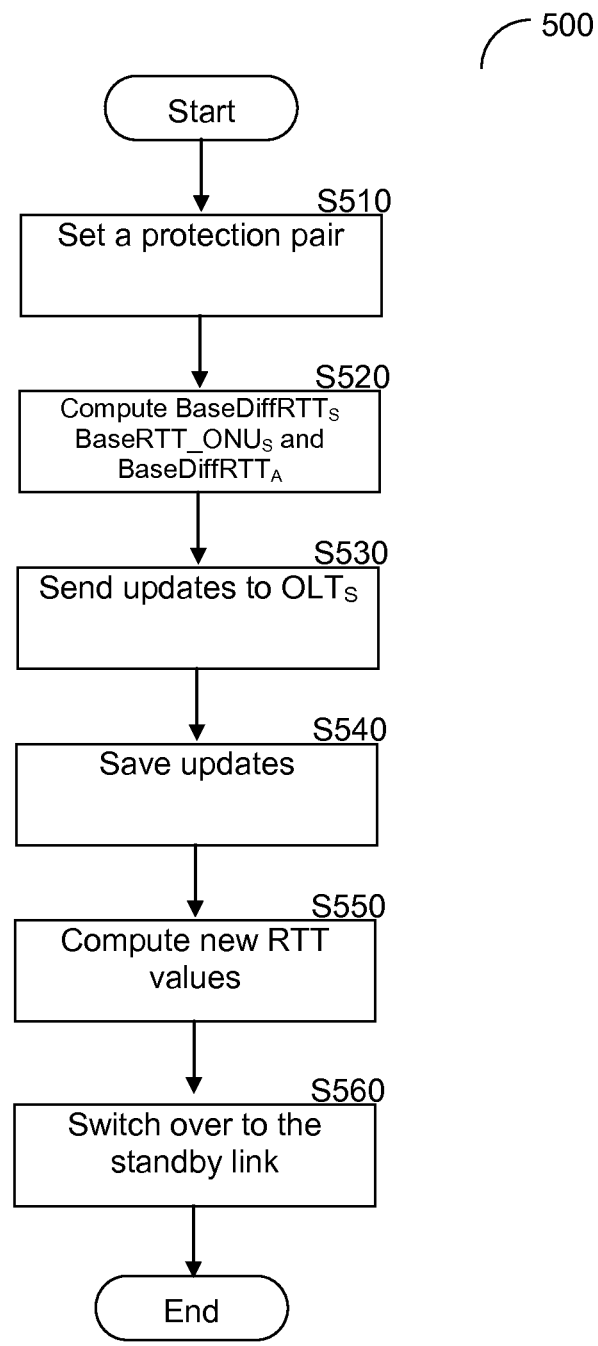
FIG. 5 is a flowchart describing a protection process implemented in accordance with an embodiment of the present invention.

FIG. 5 shows an exemplary and non-limiting flowchart 500 describing the process for performing a protection in a PON implemented in accordance with an embodiment of the invention. The method is performed after the protection maintenance link and a synchronization link between the OLTs are established. As mentioned above the synchronization link can be established over the protection maintenance link.

At S510, the active and standby links are determined by setting each OLT 310 and each optical link 320 to their respective states. At S520, each link is activated, on its turn, to compute the base differential distance values (BaseDiffRTT$_S$ and BaseRTT_ONU$_S$) as described in detail above. These values are used by the standby OLT when switching-over. In addition, the active OLT continuously calculates the RTT_ONU$_S$(t) values using the protection maintenance link.

At S530 during a normal operation of the PON, the active OLT sends over the synchronization link updated RTT and PON related information. This information includes, for example, progress reports of ONU activation process, ONU alarms indications, learned passwords, RTT(i, t) and RTT_ONU$_S$(t) measurements, and so on. At S540, upon receiving this information, the standby OLT saves the updates in its database. In one embodiment of the invention, a new RTT value is computed once the RTT(i, t) and RTT_ONU$_S$(t) measurements are received. The new RTT value is saved in the database.

At S550, as a switch-over is triggered, the standby OLT received a switch-over signal, and thereafter computes the new RTT values for each ONUs as described in detail above. These values are computed using the RTT(i, t) and RTT_ONU$_S$(t) measurements. In the case where the new RTT value is already saved in the database, then upon triggering a switch-over, this value is retrieved from the database and the computation step (S550) is not performed. Subsequently, at S560, the standby OLT starts to transmit data to the ONUs over its respective link. That is, the active link and standby link initially set at S510 are switched.

There are various faults that can trigger a switch-over of the standby link to become active. These faults include, but are not limited to, loss of signal (LOS)/loss of frame (LOF) of an active link, a faulty OLT (e.g., OLT's transceiver), loss of a communication channel between the OLT, and so on. The switch-over may be also triggered manually by a user, e.g., a network administrator.

In certain exemplary embodiments of the invention, the control of the protection mechanism can be either centralized or distributed. A switch-over decision is based on the various faults and link-status information. The failover mechanism is continuously updated with regard to the status of each of the OLT links using the collocated ONU connected to the standby link. It should be noted that in certain embodiments such configuration is required as a standby OLT cannot communicate over its fiber.

Figure 6:
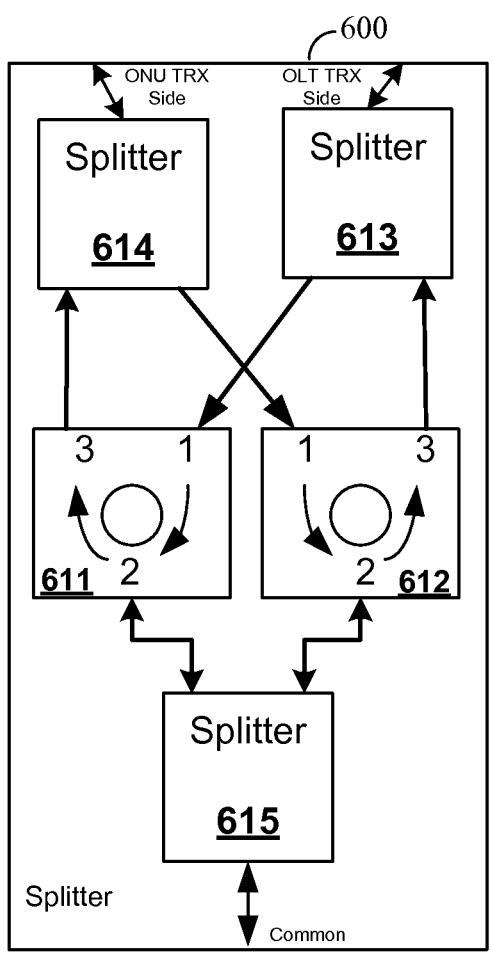
FIG. 6 is a diagram of an optical splitter constructed in accordance with an embodiment of the invention.

FIG. 6 shows an exemplary diagram of an optical splitter 600 constructed in accordance with an embodiment of the invention. The optical splitter 600 is based on two optical circulators 611 and 612. An optical circulator is a three-port device that allows light to travel in only one direction. That is, from port 1 to port 2, then from port 2 to port 3. The optical circulator 611 is coupled to splitters 614 and 615. A signal from the splitter 614 is received at port 1 and output at port 2 of the circulator 611. A signal received at port 2 of the circulator (from the splitter 615) is transferred to the splitter 614 via port 3 of the circulator 614. In a similar manner, the optical circulator 612 is coupled to splitters 613 and 615. A signal from the splitter 613 is received at port 1 and output at port 2 of the circulator 612. A signal received at port 2 of the circulator 612 is transferred to the splitter 613 via port 3 of the circulator 612. In accordance with an embodiment of the invention the 2:N splitters 370-1, 370-2, 321-1, and 321-2 are implemented using the 2:N optical splitter 600.

It should be appreciated that the invention described herein can be adapted to implement efficient protection mechanisms in any type of a PON including, but not limited to, a BPON, an EPON, and a GPON. Furthermore, the teachings of the invention can be adapted to implement a protection of more than two links.

The principles of the invention are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for performing a protection in a passive optical network (PON), comprising:
   forming a protection maintenance link between an active optical line terminal (OLT) and a standby OLT;
   forming a synchronization link between the active OLT and the standby OLT;
   computing a base differential distance value;

continuously measuring round trip time (RTT) values by the active OLT using the protection maintenance link;

periodically sending at least RTT values calculated by the active OLT to the standby OLT over the synchronization link; and computing, by the standby OLT, a new RTT value based on at least an RTT value measured by the active OLT and a standby differential distance value, when a switch-over action is triggered, thereby allowing the standby OLT to serve optical network units (ONUs) in the PON without performing a ranging process.

2. The method of claim 1, wherein the base differential distance value is a differential distance of each of the active OLT and the standby OLT from a designated ONU in the PON.

3. The method of claim 2, wherein the designated ONU is a collocated ONU coupled to each of the active OLT and the standby OLT.

4. The method of claim 2, wherein computing the base differential distance value comprises:

activating the designated ONU;

measuring a base active RTT value between the active OLT and the designated ONU;

measuring a base standby RTT value between the standby OLT and the designated ONU;

exchanging the base standby RTT value and the base active RTT value between the standby OLT and the active OLT; and determining the base differential distance value to be a difference between the base active RTT value and the base standby RTT value.

5. The method of claim 4, wherein computing the base differential distance value comprises computing the base differential distance value during installation of the PON or when a new OLT is added to the PON.

6. The method of claim 4, further comprising:

measuring, by the standby OLT, the standby differential distance value, the standby differential distance value being a differential distance between the standby OLT and the designated ONU measured at a specific time.

7. The method of claim 6, wherein the standby differential distance value is computed as follows:

$$\text{DiffRTT}_S(t) = (\text{RTT\_ONU}_S(t) - \text{BaseRTT\_ONU}_S) + \text{BaseDiffRTT}_S,$$

wherein the $\text{DiffRTT}_S(t)$ is the standby differential distance value at a specific time, RTT $\text{ONU}_S(t)$ is an RTT value measured from the active OLT to the designated ONU, $\text{BaseRTT\_ONU}_S$ is the base active RTT value, and $\text{BaseDiffRTT}_S$ is the base differential distance value.

8. The method of claim 7, wherein the new RTT value is a sum of the standby differential distance value and the RTT value measured by the active OLT.

9. The method of claim 1, wherein upon performing a switch-over, the standby OLT becomes the active OLT and the active OLT becomes the standby OLT.

10. The method of claim 3, further comprising utilizing an indication signal transmitted by the active OLT and received by the collocated ONU to indicate a status of at least one of a standby link and an active link.

11. The method of claim 1, wherein computing the new RTT value comprises computing the new RTT value upon receiving the RTT value measured by the active OLT.

12. The method of claim 1, further comprising transmitting switch-over trigger signals over the synchronization link.

13. The method of claim 1, further comprising establishing the synchronization link over the protection maintenance link.

14. A duplex passive optical network (PON), comprising:

a first optical line terminal (OLT) serving as an active OLT;

a first optical network unit (ONU) collocated to the first OLT;

a second OLT serving as a standby OLT;

a second ONU collocated to the second OLT, the first our and the second OLT being configured to exchange at least round trip time (RTT) measures and PON related information over a synchronization link; and an optical splitter configured to connect the first OLT and the second OLT and their collocated first ONU and second ONU to a plurality of ONUs.

15. The duplex PON of claim 14, wherein the first OLT is configured to control the second ONU and the second OLT is configured to control the first ONU.

16. The duplex PON of claim 14, wherein each of the first OLT and the second OLT is configured to include a database for maintaining the RTT measures and PON related information.

17. The duplex PON of claim 14, further comprising a protection maintenance link established from the first OTL and the first ONU to the second OLT and the second ONU, the protection maintenance link being configured to be used for continuous measurement of differential distance values.

18. The duplex PON of claim 17, further comprising a synchronization link established over the protection maintenance link.

19. The duplex PON of claim 17, wherein a switch-over from the active OLT to the standby OLT occurs without performing a ranging process.

20. The duplex PON of claim 19, wherein when the switch-over occurs, the standby OLT computes a respective new RTT value from the standby OLT to each of the plurality of ONUs, the respective new RTT value being a sum of an RTT value periodically measured by the active OLT and a standby differential distance value, the standby differential distance value being a differential distance between the standby OLT and the first ONU.

21. The duplex PON of claim 19, wherein prior to performing the switch-over, the standby OLT computes a respective new RTT value from the standby OLT to each of the plurality of ONUs, the respective new RTT value being a sum of an RTT value periodically measured by the active OLT and a standby differential distance value, the standby differential distance value being a differential distance between the standby OLT and the first ONU.

22. A duplex passive optical network (PON) having a network side and a subscriber side connected by at least one fiber-optic cable, the duplex PON comprising:

a first optical line terminal (OLT) and an associated first subscriber optical network unit (ONU) disposed on the network side of the duplex PON;

a second OLT and an associated second subscriber ONU disposed on the network side of the duplex PON, the first OLT and the second OLT being configured to exchange round trip time (RTT) measures over a link; and a plurality of subscriber ONUs disposed on the subscriber side of the duplex PON, wherein the second OLT is configured to compute an RTT value based on the RTT measures and a standby differential distance value related to a differential distance associated with the first OLT and the second OLT when a switch-over action is triggered, thereby allowing the second OLT to serve the plurality of ONUs without performing a ranging process.

* * * * *

UNITED STATES PATENT AND TRADEMARK OFFICE
CERTIFICATE OF CORRECTION

PATENT NO. : 8,855,491 B2  
APPLICATION NO. : 12/648885  
DATED : October 7, 2014  
INVENTOR(S) : Elmoalem et al.

Page 1 of 1

It is certified that error appears in the above-identified patent and that said Letters Patent is hereby corrected as shown below:

In the Claims

Column 8, line 9, please replace "our" with --OLT--.

Signed and Sealed this
Twenty-fourth Day of March, 2015

Michelle K. Lee
*Director of the United States Patent and Trademark Office*